United States Patent [19]

Summers

[11] 4,109,607
[45] Aug. 29, 1978

[54] REFERENCE INDEX FOR INSTRUMENT DIALS

[76] Inventor: Charles Donovan Summers, 1259 Yellowwood Dr., Columbus, Ohio 43229

[21] Appl. No.: 759,439

[22] Filed: Jan. 27, 1977

[51] Int. Cl.² ............................ G01L 7/14; G09F 9/00
[52] U.S. Cl. .................................. 116/129 A; 73/387; 116/DIG. 23
[58] Field of Search ....... 116/129 A, 129 B, DIG. 23, 116/124 R; 73/387

[56] References Cited

U.S. PATENT DOCUMENTS

| | | | |
|---|---|---|---|
| 1,160,426 | 11/1915 | Manning | 116/129 A |
| 1,857,311 | 5/1932 | Kollsman | 73/387 |
| 2,404,746 | 7/1946 | Rylsky et al. | 73/387 |
| 2,720,187 | 10/1955 | Lamb | 116/129 A |
| 3,596,178 | 7/1971 | Sklyaruk et al. | 116/129 B |

FOREIGN PATENT DOCUMENTS 255,835  9/1926  United Kingdom ................. 116/129 B

*Primary Examiner*—Daniel M. Yasich
*Attorney, Agent, or Firm*—Mahoney & Stebens

[57] ABSTRACT

A reference index is provided for dial type instruments and includes an indicator selectively positioned on the face of the instrument for operation in either of two functional modes. The reference index includes a mounting pivot which is adapted to be secured to the face of the instrument and carries a mounting block that is relatively rotatable about a pivot axis projecting from the face of the instrument dial. Carried by the mounting block is an indicator having an elongated arm which has one end pivoted in the mounting block for relative rotational movement in a plane parallel to the face of the instrument, or perpendicular to the pivot axis. Formed with the outer end of the arm are first and second reference tabs which are adapted to overlie the circular indicia ring of the instrument. The two tabs are perpendicularly disposed to each other and project transversely to the longitudinal axis of the arm. The arm may be revolved about the mounting pivot axis to place the reference tab at a desired angular position and the particular tab desired, through rotation about the longitudinal axis of the arm, is placed in parallel relationship to the face of the instrument dial for utilization of the selected tab in forming an index with respect to that dial face.

17 Claims, 9 Drawing Figures

REFERENCE INDEX FOR INSTRUMENT DIALS

BACKGROUND OF THE INVENTION

The reference index of this invention has specific application in the field of aircraft instrumentation and is specifically adapted to altitude indicating instruments or altimeters. Heretofore, attempts have been made to provide selectively positionable index or reference markers which are selectively positionable with respect to the face of the instrument dial for manual reference as to a selected or assigned altitude, or a restricted or limitative altitude which must be adhered to or strictly observed during the course of aircraft flight. The usual altimeters that are available and installed in aircraft are seldom provided with reference indexes as an element with original equipment structure. Accordingly, it is necessary to provide such reference index devices as auxiliary components in the many instances desired for facilitating maintenance of the assigned altitudes and aiding in observance of minimum altitude restrictions on instrument approaches. The known auxiliary devices available for attachment to altimeters are of a relatively expensive and cumbersome nature and are incapable of providing the desired distinctive indication that enhances the pilot's awareness of a specific assigned altitude or altitude limitation.

Another disadvantage of the known devices commercially available for this purpose, is that they are incapable of providing any selectivity as to two substantially distinct modes of operation normally encountered during flight. These two modes of operation are the maintenance of an assigned altitude on departure from an airfield and during the cruise aspects of the flight. There is also a period of time upon initial descent into an airport traffic control area wherein other assigned altitudes are given by approach controllers for effecting a safe expeditious movement of numerous aircraft through the control area. The second mode of operation desired for an altimeter reference index is associated with the instrument approach phase. Instrument approaches have either a decision height or minimum descent altitude (DH/MDA) associated with the respective approach. These altitudes are minimum restrictions that must be strictly observed for maintenance of safety and avoiding violation of aeronautical regulations.

SUMMARY OF THE INVENTION

The reference index of this invention is an economical structure that is adapted for ready installation and simplified attachment to the face of an instrument dial without utilization of any mechanical tools or additional equipment. This reference index is also designed to accommodate and provide an indication or reference index for each of the two modes of operation, specifically, assigned altitude and instrument approach altitude restrictions. The device is capable of providing the two modes of operation in a selectively distinct manner and without interference from the opposite operating mode.

In accordance with this invention, the reference index includes a mounting pivot for supporting the apparatus in association with the face of an instrument dial having a circular indicia ring. The device also includes a mounting block interengageable with the mounting pivot and enabling revolution about this pivot in a plane parallel to the face of the instrument dial to a desired and selected position. Carried by the mounting block is an indicator having an elongated arm which extends to place an endmost portion in overlying relationship to the circular indicia ring of the instrument's dial.

Formed with the indicator arm at its outer end are a pair of reference tabs which may be alternatively selected for visual reference with respect to that indicia ring. Mounting of the arm to the mounting block is by means of a pivot which permits the arm to be revolved about its longitudinal axis and thereby enable the pilot to selectively position the desired reference tab in parallel relationship to the instrument face. The reference tabs are disposed perpendicular to each other and thus only a tab placed parallel to the instrument face will be visible at any given time. The other tab will be extending perpendicular to the instrument face and essentially invisible and not observable by the pilot. This feature materially enhances safety of operation in providing two separate and distinct modes of operation that are instantly and easily selectable.

Additionally, the indicator arm is formed as a plate member having a pre-determined width which is provided with colored indicia or markers on at least a portion thereof. The arm is positionable either in vertical relationship to the dial face where these markers are not visible, or in parallel planar relationship to the dial face and thus further enhances the indication in that a greater area of distinctive indicia is provided for visual reference and indexing with respect to a desired height or altitude. This increased distinctive area of visibility is associated with the functioning of the device in a mode where it is utilized for indexing an instrument approach minimum altitude, such as the DH/MDA.

These, and other objects and advantages of this invention, will be readily apparent from the following detailed description of embodiments thereof and the accompanying drawings which are illustrative of those embodiments.

DESCRIPTION OF THE DRAWING FIGURES

DESCRIPTION OF THE ILLUSTRATIVE EMBODIMENTS

Figure 1:
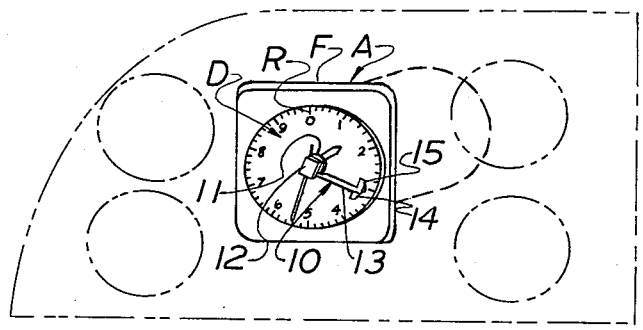
FIG. 1 is a persepective view of an aircraft altimeter shown in relationship to an instrument panel with the altimeter provided with a reference index of this invention.

Having reference to FIG. 1 of the drawings, a portion of an aircraft instrument panel is diagrammatically illustrated in broken lines. Mounted in this panel is an altimeter A which is secured to the panel by means of a substantially rectangularly shaped mounting flange F. The illustrated altimeter A with which this reference index is particularly adapted, is the circular dial type having a dial face D which is formed from a clear glass plate. Disposed immediately rearward of the dial face D is an indicator plate having a circular indicia ring R. Dial face D is customarily recessed from the outermost surface of the mounting flange F and this flange may also be provided with lights or illuminating devices for low light level conditions.

Mounted on and secured to the outer face of the dial D is a reference index 10 embodying this invention. This reference index 10 includes the basic structural components of mounting pivot 11, mounting block 12 and indicator 13. The mounting pivot 11 is adapted to the secured or rigidly affixed at the center of the dial face D and the mounting block 12 is revolvably mounted on the pivot 11. Also, the indicator 13, which comprises an elongated arm, is mechanically coupled with the mounting block 12 in a manner permitting the selective positioning of the arm in either of two positions. Formed with the indicator arm 13 at an outer end thereof are a pair of reference tabs 14 and 15 which are positioned to overly the ciruclar indicia ring R.

Figure 6:
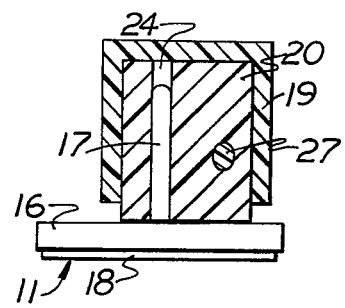
FIG. 6 is a vertical sectional view taken along line 6—6 of FIG. 2.

The mounting pivot 11 includes a circular base plate 16 and an elongated pivot pin 17 attached to the base plate in outwardly projecting relationship thereto. This pivot pin 17 can be best seen in the sectional views, such as FIG. 6, and is centrally located with respect to the circular base plate. Attachment of the mounting pivot 11 to the dial face D can be best seen in FIG. 3 wherein a thin layer 18 of adhesive material is shown interposed between the adjacent surfaces of plate 16 and the dial face D. For convenience of installation, this adhesive layer may be provided on the lower surface of the plate 16 and have a protective covering (not shown) in the form of a foil applied to the exposed surface for shipment. In mounting of the reference index on the altimeter, this protective covering foil is first removed and the plate 16 then merely pressed against the altimeter dial face in coaxially aligned relationship thereto with the adhesive layer 18 thus securing the plate in bonded relationship to the dial.

Figure 5:
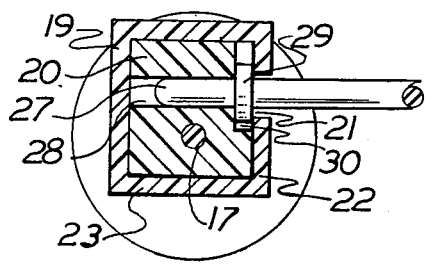
FIG. 5 is a fragmentary horizontal section view taken along 5—5 of FIG. 3.

Forming the mounting block 12, is a rigid-walled retainer 19 and a connector block 20 which is inserted within and contained by the rigid-walled retainer. The connector block 20, in accordance with this invention, is formed from a resilient elastomeric material, which resilience characteristics in combination with the precise dimensioning of the block to closely interfit within the retainer 19 assures that the block and retainer will be securly maintained in mechanically coupled relationship upon installation and assembly with the mounting pivot 11. Preferably, the interengaging surfaces of the connector block 20 and retainer 19 are coated with a suitable adhesive during assembly to assure that these components will not become inadvertently separated during use of index. It will also be noted by reference to FIG. 5, as well as FIG. 2, that the mounting block 20 is rectangular in cross-section with the sidewall dimensions in this illustrative embodiment being of the order of 5 and 6 millimeter, respectively, on a side. To further illustrate the dimensional size of this unit, the mounting block 20 has a vertical dimension of 6.3 millimeter in this illustrative embodiment.

Figure 7:
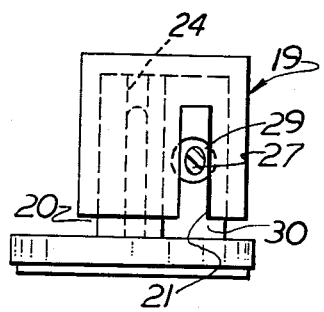
FIG. 7 is a fragmentary vertical sectional view taken along line 7—7 of FIG. 2.
Figure 8:
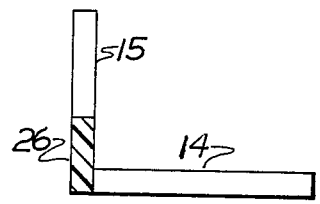
FIG. 8 is a fragmentary vertical sectional view on an enlarged scale taken along line 8—8 of FIG. 2.

Referring to FIG. 7, it will be seen that the one of the longer side walls 22 of the retainer 19 is provided with a vertically extending slot 21. This slot 21 is open at the lower end or bottom edge of the respective side wall 22 of the retainer.

It will also be noted by reference to the several FIGS. that the inter-connection of the mounting pivot 11 with the mounting block 12 is such that the elongated pivot pin 17 couples with the connector block 20 is a relatively eccentric or offset relationship. This offset will be noted to be along the longer axis of the mounting block 12 and thus provides a relatively greater space between the pin and the one shorter of the two side walls 23 of the retainer 19. Also, the connector block 20 projecting a slight distance from below the bottom edges of the retainer. Accordingly, the lowermost surface of the connector block 20 will engage the upper surface of the base plate 16 and thus form a bearing surface. For purposes of attachment, the connector block 20 is formed with a vertically extending bore 24 which, for convenience of fabrication, extends completely through the block and opens at both ends. It has been found advantageous in this specific dimensional embodiment to form this bore 24 along the longer axis of the block 20 but spaced inwardly from the one shorter sidewall about 1.7 millimeters. The diameter of the bore 24 is slightly less than the diameter of the pivot pin 17. Thus, the pin 17 and bore 24 form an interference fit having sufficient frictional force to maintain the block in association with the pin at a desired angular position but not so great as to prevent the selective revolution of the block about the pin.

Figure 2:
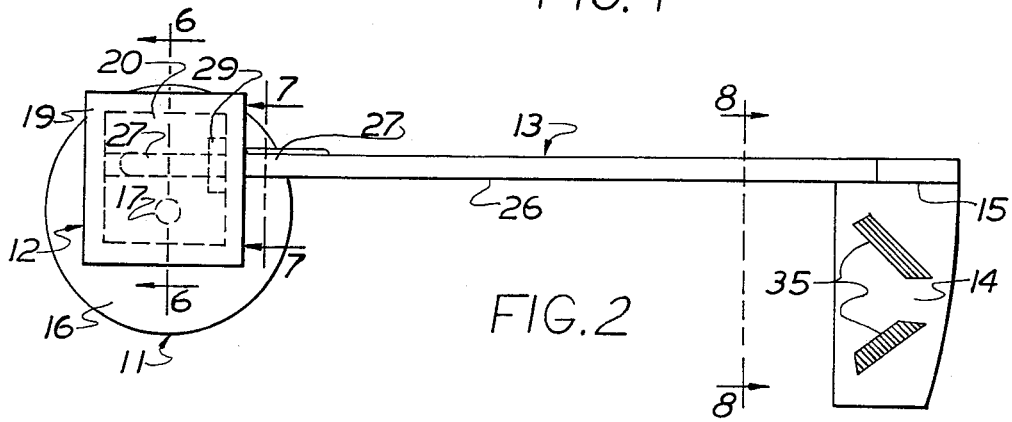
FIG. 2 is a top plan view of the reference index embodying this invention and shown in FIG. 1 but on a substantially enlarged scale.
Figure 3:
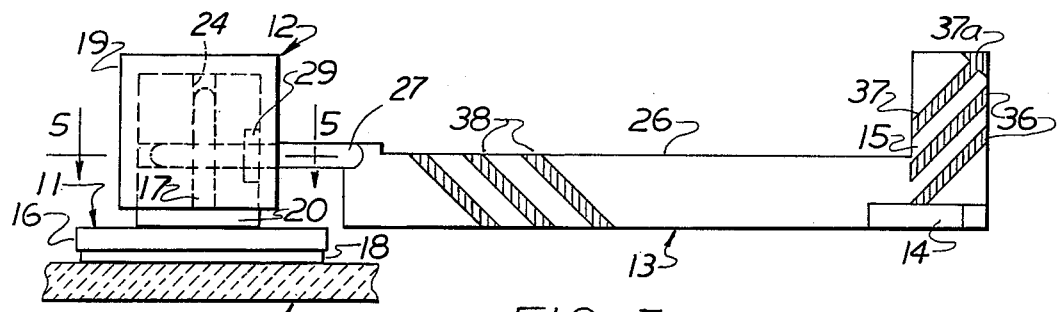
FIG. 3 is a side-elevational view of the reference index.

Forming the indicator 13 is an elongated arm 26 which is of bar form and is advantageously fabricated from a structurally strong and visually transparent material, such as some of the commercially available synthetic resin plastic materials. This arm 26 is relatively thin as can be seen in FIGS. 2 and 3, with the width thereof being substantially greater and thus forming a readily visible surface. Formed with the arm 26 and projecting axially from one end thereof is a trunion 27. This trunion 27 is preferably secured in laterally offset relationship to the central longitudinal axis of the arm. This is preferred in that the arm will then appear to be at different relatively spaced distances with respect to the dial face in the two different modes of operation and which effect will be explained in further detail hereinafter.

Mounting of the arm 26 to the mounting block 12 is effected by projecting the trunion 27 into an aperture or horizontally extending bore 28 which is formed in and extends completely through the connector block 20. This bore 28 is preferably spaced a distance of 1.7 millimeters inwardly from the other shorter side wall of the block 20 thereby being spaced 2.6 millimeters from the pivot pin 17 or its bore 24. This spacing has been formed to provide the best operating characteristics. The trunion 27 is preferably formed with an oval shaped cross-section configuration and is dimensioned with respect to the bore 28 to frictionally interfit therein and thus hold the trunion in fixed relationship with respect to the connector block 20 against rotation of the arm about its axis in opposition to the normally expected vibrational or gravitational forces. Consequently, the trunion 27 projects outwardly from the connector block 20 and supports the elongated arm 26 in substantially horizontal relationship to the dial face D.

It will also be noted that the bore 28 is formed in alignment with the vertically extending slot 21 in the side wall 22. Integrally formed with the trunion 27 is a circular flange 29 that is positioned on the trunion so as to be disposed at the inner face of the side wall 22. For this purpose the connector block 20 is preferably formed with an elongated notch or recess 30 at the corner portion thereof immediately adjacent the vertical slot 21. The flange 29 is positioned in this notch with the depth of the notch being such that the connector block of resilient material will apply a compressive force to force the flange against the inner face or surface of the side wall 22. It will be noted that the circular flange 29 is of a diameter substantially greater than the width of the vertical slot 21 and thus prevents withdrawal of the trunion from connector block by movement only in a horizontal direction. Attachment or assembly of the components can be readily effected by merely forcing the trunion 27 into its respective bore 28 from the lower end or edge of the side wall 22. When assembled in this manner, the resiliency of the connector block 20 permits sufficient deformation thereof as to enable the flange 29 to be inserted under the side wall 22 and then moved upwardly to the illustrated position in the several figures of the drawings.

Formed at the outer end of the elongated arm 26 are the reference tabs 14 and 15. Each of the reference tabs is of a rectangularly shaped plate form with the one tab 15 merely being a lateral, transverse extension in the plane of the flat plate form arm 26. The other reference tab 14 also is integrally formed with the arm and projects transversely thereto but in perpendicular relationship to the reference tab 15 and the plane of the arm. It will also be noted that the reference tab 15 which is aligned with the plane of the arm 26 projects or extends laterally at the same side as the offset of the trunion 27.

The basic functioning and operation of the reference index of this invention will be clearly understood through initial reference to FIG. 1 illustrating attachment of an embodiment thereof to an altimeter dial face D. With the components of the reference index assembled as illustrated and mounted on the dial face D, it will be seen that the elongated arm 26 projects over and parallel to the dial face. With the reference tabs 14 and 15 overlying the circular indicia ring. When thus assembled and mounted, the arm 26 may be swung in either direction to angularly displace the reference tabs 14 and 15 to any selected position with respect to indicia ring B. The frictional engagement of the pivot pin 17 in the bore 24 of the connector block 20, in combination with the frictional engagement between the base surface of the connector block and the base plate, maintains the arm in the selected position until again manually moved.

Each of these reference tabs is also preferably provided with distinctive indicia or marks that may be colored for greater visibility in the aircraft cockpit. The tab 14 is provided with two elongated bar-form areas 35 angularly disposed to each other and of green color which effectively define an arrow head. This arrow head points toward the outer end of the arm 26 and is an effective indicator. The other tab 15 is provided with a series of parallel bars 36 of distinctive color with the one bar 37 preferably having an arrow head 37a. These bars 36 and 37 are diagonally oriented relative to the longitudinal axis of arm 26 and provide a further distinctively visible configuration that is indicative of the particular mode of operation. Additionally, the one wide surface of the arm 26 is provided with an area having several diagonally extending and spaced parallel bars 38 of distinctive color to further enhance the visibility of the arm 26 in performing a reference index function when the mode of operation selected is that where the tab 15 is parallel to the dial face D.

Figure 4:
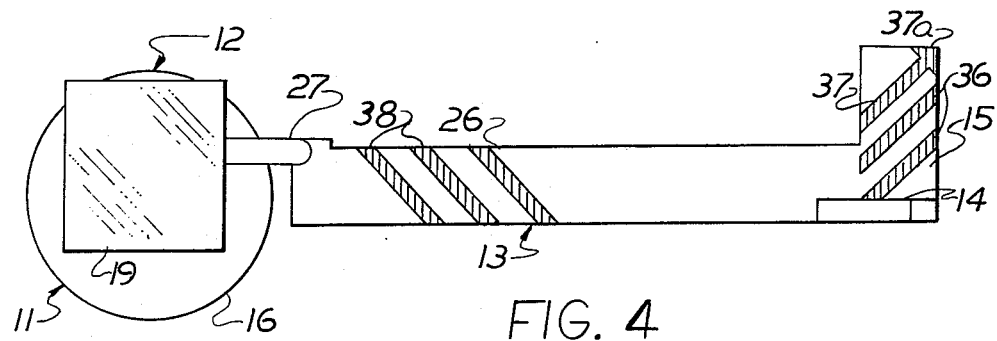
FIG. 4 is a top-plan view of the reference index similar to FIG. 2 but with the indicator displaced to the alternately selectable mode position.

With the reference index thus positioned as shown, the arm 26 may be revolved or angularly displaced from the position shown in FIGS. 2 and 3, or turned 90° about its axis to the position shown in FIG. 4. In the position shown in FIG. 2 the mode of operation is to facilitate and aid the pilot in maintaining a specific assigned altitude. Accordingly, the indicator marks 35 on the tab 14 will be visible to the pilot but the arm 26 will be effectively vertically disposed to the dial face and essentially invisible to the pilot. Similarly, the tab 15 which is vertically projecting outwardly from the dial face, will also not be readily seen or observed by the pilot.

Also, the arm 26 and tabs 14 and 15 being of transparent material, normal visual observation of the instrument's dial face will not be impaired. The mounting block 12 may be readily gripped to revolve the block and arm 26 to place the outer reference tab 15 with the arrown simulating index marks 35 immediately adjacent or opposite a particular selected or assigned altitude when the arm 26 is positioned as shown in FIGS. 2 and 3. With the arm thus positioned, the pilot will have a continually indicating reference index to remind him of that particular assigned altitude. Changes are easily affected as further altitudes are assigned through revolution of the mounting block 12 about the pivot pin 17.

To select the second mode of operation, the pilot merely places a finger against the reference tabs 14 and 15 at the end of the indicator arm 26 and pushes primarily against the upstanding tab which, in the case of FIGS. 2 and 3, is tab 15. Application of a force against the tab 15, will cause the arm to revolve about the axis of the trunion 27 with the revolving movement stopped when the tab 15 engages and is disposed parallel to the dial face. There is a certain degree of resilience in the connector block 20 which permits the arm 26 to be flexed downwardly where it may contact the face of the dial and thus form a pivot or fulcrum, to facilitate the rotation of the arm about the trunion axis. When thus turned to the position shown in FIG. 4, the surface of the arm 26 carrying the indicia marks 36, 37 and 38 will then be visible to the pilot and are utilized in indicating the DH/MDA on an instrument approach. Again, the rotatable mounting of the mounting block 12 on the pivot 11, enables the reference tab 15 to be appropriately positioned angularly about the dial face to place the arrowhead indicator immediately adjacent the restricting or minimum altitude for that particular approach. It will also be noted that with the arm 26 and tab 15 positioned as in FIG. 4 for this second operating mode, the arm will be displaced a distance from the face of the dial, as a consequence of the eccentric arrangement of the trunion and arm, and thereby further enhances the visibility of the arm and its indicia marks 37 and 38. The eccentric mounting of the trunion to the arm is coordinated with the vertical height of the bore 28 in mounting block 20 to assure clearance of the arm 26 relative to the dial face in either of the two operating mode positions.

The reference index, as illustrated in FIGS. 1 through 8, is designed to be of a portable nature. It is portable to the extent that, while the mounting pivot 11 normally be permanently secured to the face of an altimeter dial, the indicator 13 and its associated mounting block 12 can be removed and utilized with another pivot 11 attached to the altimeter in a different aircraft, or a different altimeter in the same aircraft. This feature is particularly useful for the instances where a pilot may have utilization of several aircraft and does not desire to have a reference index of this invention permanently installed in any particular aircraft.

Figure 9:
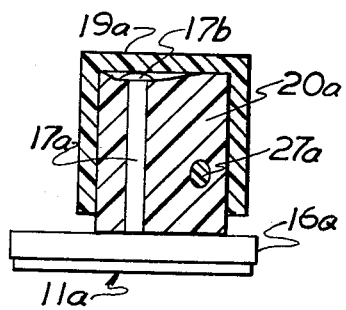
FIG. 9 is a vertical sectional view similar to FIG. 6 but showing a modified mounting block and pivot structure.

However, for instances where a permanent installation is desired, a modified structure, such as that shown in FIG. 9, may be found particularly useful. That figure illustrates a cross-sectional view of a mounting block 12 and its interconnection with a modified pivot 11a. In that structure, the pivot pin 17a is of a length to extend entirely through the connector block 20a. Formed with the pin 17a, at the upper end thereof, is an enlarged head 17b designed to overlie the upper surface of the connector block. This head 17b may be of a size such that when the connector block 20a is positioned on a pin 17a, the head will sufficiently overlie the block as to prevent its withdrawal from the pin. In assembly of the components as shown in FIG. 9, the resilient connector block 20a would be coated with a suitable adhesive such that when inserted within the retainer 19a the adjacent contacting walls would be adhesively bonded together and form an inseparable structure.

Having thus described this invention in conjunction with the illustrative embodiments, it will be readily apparent that a novel reference index having particularly advantageous operating characteristics has been provided for dial type instruments. The reference index of this invention is capable of providing two readily selected modes of operation that are non-interfering with respect to each other. The index is easily mountable on a dial face and does not interfere with normal visual observation of the instruments indicia.

Having thus described this invention, what is claimed is:

1. A reference index for dial-type instruments with a face having a circular indicia ring comprising
   a mounting pivot including a base plate and an elongated pivot pin having a longitudinally extending pivot pin axis, said pivot pin secured to said base plate in perpendicular relationship thereto, said base plate adapted to be rigidly affixed to the face of the instrument in coaxially positioning the pivot pin relative to the indicia ring for projection outwardly from the instrument's face,
   a mounting block positionable on said mounting pivot in retained relationship and selectively revolvable about said pivot pin axis,
   an indicator carried by said mounting block for revolution therewith in a plane perpendicular to said pivot pin axis, said indicator having an elongated arm projecting ransversely to said pivot pin axis for movement in the plane of revolution and an indicator index carried by said arm at a position radially outward from the pivot pin axis so as to be in cooperative indicating relationship to the indicia ring when said mounting pivot is affixed to the instrument, said elongated arm having an end journalled in said mounting block to enable revolution of the arm about a longitudinally extending axis of the arm, said indicator index including at least one reference tab of plate form extending transversely to said arm, said tab positionable in either parallel or perpendicular relationship to the instrument's face in accordance with selective revolution of said arm about its longitudinally extending axis.

2. A reference index according to claim 1 wherein said base plate has a bottom surface provided with a layer of adhesive material for affixing said mounting pivot to the instrument face.

3. A reference index according to claim 1 wherein said mounting block includes a connector block formed from an elastomeric material, said connector block having an elongated bore formed therein for receiving said pivot pin therein in frictional interengagement to maintain said mounting block in an attained position relative to said mounting pivot.

4. A reference index according to claim 3 wherein said connector block has a base surface disposed in contacting engagement with an upper surface of said base plate.

5. A reference index according to claim 3 wherein said bore extends through said connector block and opens at each surface thereof, said pivot pin being of a length to extend through said bore and provided at the one end remote to said base plate with an enlarged head to overlie adjacent surface portions of said connector block to retain the connector block on said pivot pin.

6. A reference index according to claim 3 wherein said mounting block includes a rigid walled retainer encircling said connector block in closely interfitting relationship.

7. A reference index according to claim 6 wherein said retainer has one end thereof closed.

8. A reference index according to claim 1 wherein said indicator index includes two reference tabs of plate form extending transversely to said arm, said tabs disposed in substantially mutually perpendicular relationship.

9. A reference index according to claim 8 wherein said arm is of bar form with a relatively large width to thickness ratio, said one reference tab coplanar with said bar in its width direction and the other reference tab perpendicular thereto.

10. A reference index according to claim 9 wherein the one reference tab coplanar with said bar projects a distance transversely from said bar, and said arm includes a mounting trunion projecting axially therefrom at an end opposite said reference tabs, said trunion journalled in said mounting block.

11. A reference index according to claim 10 wherein said trunion is laterally offset to said bar at the same side thereof as the coplanar tab.

12. A reference index according to claim 1 wherein said arm includes a mounting trunion projecting axially therefrom at an end opposite said reference tab and is journalled in said mounting block.

13. A reference index according to claim 12 wherein said mounting block includes a connector block formed from an elastomeric material and has an elongated trunion receiving bore formed therein in transversely extending relationship to said pivot pin axis, said trunion receiving bore frictionally engaging said trunion to maintain the indicator in an attained position relative to said mounting block.

14. A reference index according to claim 13 wherein said trunion has an oval shaped cross section.

15. A reference index according to claim 13 wherein said connector block has an elongated, pivot pin-receiving bore formed therein in spaced relationship to said trunion receiving bore.

16. A reference index according to claim 13 wherein said mounting block includes a rigid walled retainer encircling said connector block in closely interfitting relationship, said retainer having an opening formed in a wall thereof in alignment with said trunion receiving bore for passage of said trunion therethrough.

17. A reference index according to claim 16 wherein said trunion is provided with a radially extending flange interposed between adjacent surfaces of said connector block and the wall of said retainer provided with said opening, said flange having a larger dimension than said opening to prevent passage of said flange therethrough.

* * * * *